United States Patent [19]

Sun

[11] Patent Number: 6,057,261

[45] Date of Patent: May 2, 2000

[54] ONE STEP CONVERSION OF METHANOL TO HYDROGEN AND CARBON DIOXIDE

[75] Inventor: Hsiang-ning Sun, Houston, Tex.

[73] Assignee: Exxon Chemical Patents Inc., Houston, Tex.

[21] Appl. No.: 09/236,055

[22] Filed: Jan. 21, 1999

Related U.S. Application Data

[62] Division of application No. 08/959,669, Oct. 29, 1997, Pat. No. 5,904,880
[60] Provisional application No. 60/034,114, Dec. 31, 1996.

[51] Int. Cl.$^7$ .............................. B01J 23/02; B01J 23/00; B01J 21/08
[52] U.S. Cl. .......................... 502/341; 502/340; 502/342; 502/343; 502/344; 502/302; 502/303; 502/202; 502/232; 502/242; 502/250; 502/251; 502/252; 502/243
[58] Field of Search ..................... 502/524, 525, 502/340–343, 349, 344, 303, 302, 202, 232, 242, 250, 251, 252, 243

[56] References Cited

U.S. PATENT DOCUMENTS

| | | | |
|---|---|---|---|
| 3,179,500 | 4/1965 | Bowen et al. | 23/260 |
| 3,278,453 | 10/1966 | Wennerberg | 252/463 |
| 3,393,979 | 7/1968 | Holmes et al. | 23/212 |
| 3,515,514 | 6/1970 | Holmes et al. | 23/212 |
| 3,736,267 | 5/1973 | Bart et al. | 502/524 |
| 4,025,457 | 5/1977 | Tomita et al. | 252/373 |
| 4,496,785 | 1/1985 | Miller et al. | 585/640 |
| 4,499,205 | 2/1985 | Masuda | 502/303 |
| 4,511,673 | 4/1985 | Eto | 502/333 |
| 4,579,995 | 4/1986 | Mauldin | 585/640 |
| 4,636,378 | 1/1987 | Pastor et al. | 502/525 |
| 4,670,187 | 6/1987 | Schurmans et al. | 252/373 |
| 4,780,300 | 10/1988 | Yokoyama et al. | 502/318 |
| 4,840,783 | 6/1989 | Quang et al. | 423/648.1 |
| 4,913,842 | 4/1990 | Yoneoka et al. | 252/373 |
| 5,380,692 | 1/1995 | Nakatsuji et al. | 502/253 |
| 5,565,400 | 10/1996 | Holmgren | 502/328 |
| 5,635,439 | 6/1997 | Fukui et al. | 502/326 |
| 5,736,114 | 4/1998 | Barthe et al. | 502/524 |

FOREIGN PATENT DOCUMENTS

| | | |
|---|---|---|
| 227 461 | 7/1987 | European Pat. Off. . |
| 32 28 268 | 2/1984 | Germany . |
| 35 18094 | 11/1985 | Germany . |

OTHER PUBLICATIONS

PCT International Search Report, PCT/US 97/24124, May 11, 1998.
Y. Ogino, et al., "Catalytic Activity for Methanol Synthesis of Zinc Oxide–Chromium Oxide–Copper Oxide Catalysts and its Structural Dependency," Bull. Chem. Soc., Japan (1960), vol. 33, pp. 358–363 Sep. 1959.
Kagaku Kogaku Ronbunshu, (1991) vol. 17, No. 2, pp. 288–296 (Abstract) month N/A.
Journal of Applied Catalysis. A, General, 125 (1) 145–157 Dec. 1994.
Kirk–Othmer Encyclopedia of Chemical Technology, 4$^{th}$ Edition, 1997, John Wiley & Sons, Inc., vol. 11, pp. 1098–1121 month N/A.
Chadwick, D., et al., Catalysis Letter, vol. 20 (3–4), pp. 231–242 (1993) May 1993.

*Primary Examiner*—Mark L. Bell
*Assistant Examiner*—Patricia L. Hailey
*Attorney, Agent, or Firm*—Bradley A. Keller; Douglas J. Collins

[57] ABSTRACT

The present invention provides a methanol reforming catalyst having the following general formula on a dry basis:

$$X_aY_bZ_cO_d, \text{ wherein}$$

X is a metal selected from the group consisting of zinc, cadmium, mercury, rubidium, cesium, silver, and combinations thereof, Y is a metal selected from the group consisting of beryllium, magnesium, calcium, strontium, barium, and combinations thereof, Z is a material selected from the group consisting of boron, silicon, aluminum, silicoaluminate, zirconium, titanium, hafnium, gallium, lanthanum, scandium, and yttrium, and combinations thereof, and O is the element of oxygen. The claimed methanol reforming catalyst contains neither copper oxide nor chromium oxide.

8 Claims, No Drawings

ONE STEP CONVERSION OF METHANOL TO HYDROGEN AND CARBON DIOXIDE

CROSS REFERENCE TO RELATED APPLICATIONS

This application is a divisional of U.S. patent application Ser. No. 08/959,669, filed Oct. 29,1997, now U.S. Pat. No. 5,904,880. U.S. patent application Ser. No. 08/959,669 claimed priority to U.S. Provisional Patent Application Ser. No. 60/034,114, filed Dec. 31, 1996.

FIELD OF THE INVENTION

The present invention relates to a catalyst, which does not contain copper oxide and/or chromium oxide, for reforming methanol.

BACKGROUND OF THE INVENTION

Hydrogen can be produced for fuel cells and for other purposes such as chemical and power related applications by reforming methanol with steam to produce carbon dioxide and hydrogen:

$$CH_3OH+H_2O \rightleftharpoons CO_2+3H_2$$

Ordinarily, a two-step reaction is required. In the first step, methanol decomposes to hydrogen and carbon monoxide:

$$CH_3OH \rightleftharpoons CO+2H_2 \qquad (1)$$

In the second step, known as a "water shift" reaction, the carbon monoxide reacts with water to form carbon dioxide and additional hydrogen:

$$CO+H_2O \rightleftharpoons CO_2+3H_2 \qquad (2)$$

A one-step process for reforming methanol would be more cost efficient and amenable to more applications.

Theoretically, catalysts that synthesize methanol from carbon dioxide and water should be able to reform methanol to carbon dioxide and hydrogen. However, catalysts that synthesize methanol tend to rapidly deactivate during the reforming of methanol with steam. Methanol reforming catalysts which reform methanol in one step without being rapidly deactivated are desirable.

SUMMARY OF THE INVENTION

The present invention provides a methanol reforming catalyst having the following general formula on a dry basis:

$$X_aY_bZ_cO_d$$

in which
X is a metal selected from the group consisting of beryllium, magnesium, calcium, strontium, barium, zinc, cadmium, mercury, rubidium, cesium, silver and combinations thereof;
Y is a metal selected from the group consisting of beryllium, magnesium, calcium, strontium, barium, and combinations thereof;
Z is a material selected from the group consisting of boron, silicon, aluminum, silicoaluminate, zirconium, titanium, hafnium, gallium, lanthanum, scandium, and yttrium, and combinations thereof;
O is the element of oxygen;
d varies depending on the oxidation states of X, Y and Z; and the ratio of a:b and a:c is about 1:0.001 to about 1000;
wherein said methanol reforming catalyst contains neither copper oxide nor chromium oxide.

DETAILED DESCRIPTION OF THE INVENTION

Substantially all of the methanol reforming catalysts in current use or reported in literature contain either copper oxide and/or chromium oxide. The present inventor discovered that methanol reforming catalysts that do not contain copper oxide and/or chromium oxide are more efficient at reforming methanol to carbon dioxide and hydrogen, and that such catalysts are not as rapidly deactivated as catalysts that do contain copper oxide and/or chromium oxide.

The methanol reforming catalysts of the present invention have the following general composition [dry basis]:

$$X_aY_bZ_cO_d$$

wherein
X is a metal selected from Group IA, Group IB, Group IIA, and Group IIB of the Periodic Table of the Elements. Such metals include, but are not necessarily limited to, beryllium, magnesium, calcium, strontium, barium, zinc, cadmium, mercury, rubidium, cesium, silver, and combinations thereof. In a preferred embodiment, X is selected from the group consisting of zinc, cadmium, mercury, and combinations thereof;
Y is selected from the group consisting of beryllium, magnesium, calcium, strontium, barium, and combinations thereof;
Z is a support, filler, or binder material comprising other metals, such as Group IIIA and IVA metals, including but not limited to boron, silicon, aluminum, a silicoaluminate, zirconium, titanium, hafnium, gallium, lanthanum, scandium, yttrium, and combinations thereof. In a preferred embodiment, because aluminum and silicon are not readily oxidized or reduced, Z is selected from the group consisting of aluminum, silicon, and combinations thereof;
O is the element of oxygen;
a:b and a:c is a ratio of 1:0.001 to 1000, preferably 1:0.01 to 100; most preferably 1:0.1 to 10; and
d varies depending on oxidation states of X, Y, and Z.
Preferably, total metal loading should range to about 50%, based upon the total weight of the catalyst composition (dry basis) each metal being calculated as the respective metal oxide.

The metal compounds used to prepare the catalysts may be any inorganic or organometallic material which will decompose upon exposure to sufficient heat and/or oxidizing agent to provide metal oxides. Soluble metal compounds that will form solutions from which the compounds can be impregnated onto a solid support, and then subjected to heat decomposition are preferred. Water soluble metal salts are most preferred. Examples of such materials are organic salts, such as the complex salt of acetyl acetone, acetate, formate, amine salts, and the like. Nitrate salts are preferred, and provide a readily available, cost-effective means for impregnating from aqueous solutions of metal onto a support. For example, an alumina powder can be impregnated with a zinc compound and the impregnated powder can be formed into different shapes, or the zinc can be impregnated upon a previously prepared support of desired shape, e.g., pills, pellets, tablets, beads, extrudates, sieved particles, or the like.

The catalysts may be prepared by a number of methods known in the art, such as dry mixing, incipient wetness impregnation, ion-exchange, co-precipitations, etc. For impregnation, a solid, dry support should be contacted with a solution of one compound or salt, e.g., a zinc salt, and then with a solution of another compound or salt, e.g., calcium salt, or vice versa. The solid support also may be contacted with a solution containing more than one compound or salt. Preferably, the solid support should be impregnated (a) via the incipient wetness technique, which requires a minimum of solution so that the total solution is absorbed, initially or after some evaporation, or (b) by a technique requiring absorption from a solution, or solutions, with subsequent filtration or evaporation to effect total uptake of the components. The impregnation can be carried out under a wide range of conditions, including ambient or elevated temperatures, and atmospheric or supratmospheric pressures. The impregnated support thereafter can be dried and calcined.

Alternately, the catalyst can be prepared in an unsupported form by precipitation methods. For example, the catalyst can be formed by mixing suitable reagents, such as the compounds, or salts, of the desirable metal components and a base, such as sodium hydroxide, sodium carbonate, ammonium hydroxide, etc. The metals form a coprecipitate upon contact with the basic reagent.

After impregnation or precipitation, the catalyst can be dried by heating at a temperature above about 25° C., preferably in the range of from about 75° C. to 150° C., in the presence of nitrogen and/or oxygen, in an air stream, or under vacuum. The catalyst should be calcined at a temperature sufficient to decompose the metals in the composite, or their salts, and form the respective metal oxides. Suitable temperatures for the calcining are in the range of from about 100° C. to about 700° C., preferably in the range of from about 200° C. to about 500° C. Excessive temperatures should be avoided. The catalyst may be activated by reduction, preferably by contact with hydrogen or a hydrogen-containing gas at temperatures in the range of from about 200° C. to about 500° C., preferably from about 250° C. to about 350° C.

Once the catalyst has been activated, a mixture of methanol and water may be contacted with the catalyst, preferably in a fixed bed (a) in a catalytic zone at a temperature in the range of from about 100° C. to about 1000° C., preferably in the range of from about 200° C. to about 800° C., most preferably in the range of from about 400° C. to about 700° C., and, (b) at pressures ranging in the range of from about 0.068 kPa to about 6,800 kPa (0.01–1000 psia), preferably in the range of from about 0.68 kPa to about 5,440 kPa (0.1–800 psia), most preferably in the range of from about 3.9 kPa to about 1,700 kPa (0.5–250 psia). The molar ratio of methanol to water should be about 1 or less, preferably less than 1. The weight hourly space velocity—that is, the ratio between the hourly flow rate by weight of methanol and the weight of catalyst—should be in the range of from about 0.01 hr$^{-1}$ to about 500 h$^{-1}$, preferably in the range of from about 0.1 hr$^{-1}$ to about 200 hr$^{-1}$, and is most preferably in the range of from about 0.3 hr$^{-1}$ to about 50 hr$^{-1}$. The rate of conversion can be controlled by varying the reaction parameters. Typically, lower weight hourly space velocity and higher temperatures favor higher conversion rates.

The present invention is useful to produce hydrogen fuel cells. A fuel cell is an electrochemical device that converts the chemical energy of a fuel directly into electrical and/or thermal energy, as taught *Kirk-Othmer Encyclopedia of Chemical Technology,* 4th Edition, 1997, John Wiley & Sons, Inc., Volume 11, pp. 1098–1121, which is herein incorporated by reference.

The invention will be better understood with reference to the following examples.

EXAMPLE I

Catalyst Preparation

An aqueous solution was prepared by dissolving 6.97 grams of zinc acetate dihydrate and 4.21 grams of calcium acetate monohydrate in 50 cc of water at room temperature. To this solution was added 1.5 grams of Grade 135 silica-alumina and 0.5 grams of grade 951 silicon, both purchased from Aldrich Chemical Company. This mixture was dried at 110° C. followed by calcination at 550° C. for sixteen hours. The catalyst then was ground and pelletized to give mesh particles in the range of −16 to +20 mesh for further evaluation.

EXAMPLE II

Methanol Reforming 5.0 cc (approximately 3.3 grams) of catalyst prepared as in Example I was mixed with 15 cc of quartz beads and loaded into a 1.9 cm (¾ inch) outer diameter 316 stainless steel tubular reactor which was heated by a three zone electric furnace. The first zone acting as the preheating zone, vaporized the feed. The temperature of the center zone was set at 480° C. The pressure was maintained at about 134 kPa (5 psig). A 1:1 (molar) mixture of methanol and water was contacted with the catalyst at a weight hourly space velocity of 0.89 hr$^{-1}$. The effluent was analyzed at predetermined intervals by an on-line gas chromatograph fitted with both a thermal conductivity detector and a flame ionization detector. The conversion of methanol to carbon dioxide and hydrogen was essentially 100%. Only very small amounts of methane, CO, and dimethyl ether were detected in the effluent.

This example illustrates that a one-step process for reforming is achievable as per the methods of the present invention.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

What is claimed is:

1. A methanol reforming catalyst having the following general formula on a dry basis:

$$X_a Y_b Z_c O_d$$

in which

X is a metal selected from the group consisting of zinc, cadmium, mercury, rubidium, cesium, silver and combinations thereof;

Y is a metal selected from the group consisting of beryllium, magnesium, calcium, strontium, barium, and combinations thereof;

Z is a material selected from the group consisting of boron, silicon, aluminum, silicoaluminate, zirconium, titanium, hafnium, gallium, lanthanum, scandium, and yttrium, and combinations thereof;

O is the element of oxygen;

d varies depending on the oxidation states of X, Y and Z; and the ratio of a:b and a:c is about 1:0.001 to about 1000;

wherein said methanol reforming catalyst contains neither copper oxide nor chromium oxide.

2. The catalyst of claim 1 wherein Z is selected from the group consisting of aluminum, silicon, and combinations thereof.

3. The catalyst of claim 1 wherein X is selected from the group consisting of zinc, cadmium, mercury and combinations thereof.

4. The catalyst of claim 2 wherein X is selected from the group consisting of zinc, cadmium, mercury and combinations thereof.

5. The catalyst of claim 1 wherein the ratio of a:b and a:c is about 1:0.01 to about 100.

6. The catalyst of claim 4 wherein the ratio of a:b and a:c is about 1:0.01 to about 100.

7. The catalyst of claim 1 wherein the ratio of a:b and a:c is 1:0.1 to 10.

8. The catalyst of claim 6 wherein the ratio of a:b and a:c is 1:0.1 to 10.

* * * * *